United States Patent
Multani et al.

(10) Patent No.: US 10,310,718 B2
(45) Date of Patent: Jun. 4, 2019

(54) ENABLING INTERACTION WITH AN EXTERNAL SERVICE FEATURE

(71) Applicant: Microsoft Technology Licensing, LLC., Redmond, WA (US)

(72) Inventors: Shavinder Singh Multani, Redmond, WA (US); Alberto Swett, Redmond, WA (US); Karvell Ka Yiu Li, Bellevue, WA (US); Akshay Navneetlal Mutha, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 366 days.

(21) Appl. No.: 15/190,091

(22) Filed: Jun. 22, 2016

(65) Prior Publication Data
US 2017/0371521 A1    Dec. 28, 2017

(51) Int. Cl.
*G06F 21/10* (2013.01)
*G06F 3/0484* (2013.01)
(Continued)

(52) U.S. Cl.
CPC ........ *G06F 3/04842* (2013.01); *G06F 3/0482* (2013.01); *G06F 8/30* (2013.01);
(Continued)

(58) Field of Classification Search
None
See application file for complete search history.

(56) References Cited

U.S. PATENT DOCUMENTS 7,546,462 B2    6/2009    Upton
8,306,504 B1 *  11/2012   Rincker ................. G06F 21/36
                                                        455/411
(Continued)

FOREIGN PATENT DOCUMENTS

CN      101447011 A      6/2009
WO      2014182914 A1    11/2014
WO      2015017380 A1    2/2015

OTHER PUBLICATIONS

"TestFlight Beta Testing (Optional)", Published on: Sep. 22, 2015 Available at: https://developer.apple.com/library/mac/documentation/LanguagesUtilities/Conceptual/iTunesConnect_Guide/Chapters/BetaTestingTheApp.html.
(Continued)

*Primary Examiner* — Justin S Lee
(74) *Attorney, Agent, or Firm* — Merchant & Gould

(57) ABSTRACT

Enabling interaction with an external service feature via a productivity application is provided. Features in an application are oftentimes an integration of an external or third party service into the application. To enable access to a feature, such as for testing purposes, a secret globally unique identifier (GUID) is input into a designated interface of the application, and a request is sent to enable the external service feature, wherein the request provides an indication to provide resources to interact with the external service feature. The application receives the resources and enables interaction with the external service feature via the productivity application by providing an interface within the productivity application for interacting with the external service feature. Various GUIDs may be used to enable different features. Further, another GUID may be used to disable interaction with the external service feature.

20 Claims, 12 Drawing Sheets

(51) Int. Cl.
*G06F 3/0482* (2013.01)
*G06F 8/30* (2018.01)
*H04L 29/08* (2006.01)
*G06F 9/54* (2006.01)
*G06Q 10/10* (2012.01)
*H04W 12/06* (2009.01)

(52) U.S. Cl.
CPC .............. *G06F 9/54* (2013.01); *G06Q 10/10* (2013.01); *H04L 67/20* (2013.01); *H04L 67/34* (2013.01); *H04W 12/06* (2013.01); *H04L 67/02* (2013.01)

(56) References Cited

U.S. PATENT DOCUMENTS

| | | | | |
|---|---|---|---|---|
| 8,566,298 | B1* | 10/2013 | Nagaralu | G06F 9/526 707/704 |
| 8,577,334 | B1* | 11/2013 | Smith | H04W 12/08 455/410 |
| 8,800,050 | B2 | 8/2014 | Ray | |
| 8,887,181 | B1* | 11/2014 | Gigliotti | G06F 9/44526 713/1 |
| 8,918,854 | B1* | 12/2014 | Giobbi | G06K 7/10366 726/9 |
| 8,943,316 | B2 | 1/2015 | Vainstein | |
| 9,087,156 | B2 | 7/2015 | Patton et al. | |
| 9,197,694 | B2 | 11/2015 | Palmeri et al. | |
| 2003/0118354 | A1* | 6/2003 | Konno | G03G 15/55 399/9 |
| 2005/0131833 | A1* | 6/2005 | Martinelli | G06Q 20/367 705/59 |
| 2006/0059571 | A1* | 3/2006 | Chen | G06F 21/10 726/29 |
| 2008/0214239 | A1* | 9/2008 | Hashimoto | G06F 3/0481 455/557 |
| 2008/0229239 | A1* | 9/2008 | Elumalai | G06Q 10/10 715/810 |
| 2010/0199089 | A1* | 8/2010 | Vysogorets | G06F 21/34 713/168 |
| 2013/0024394 | A1* | 1/2013 | Yamahara | G06F 17/30867 705/347 |
| 2014/0075516 | A1* | 3/2014 | Chermside | H04L 63/061 726/4 |
| 2014/0282821 | A1* | 9/2014 | Adler | H04L 63/10 726/1 |
| 2015/0135333 | A1* | 5/2015 | Biswas | H04L 63/102 726/28 |
| 2016/0092339 | A1* | 3/2016 | Straub | G06F 9/44521 717/124 |
| 2017/0046531 | A1* | 2/2017 | Roberts | G06F 21/6218 |
| 2017/0083292 | A1* | 3/2017 | McLaughlan | G06F 8/34 |

OTHER PUBLICATIONS

Bettin, Chris, "How to Re-Sign an iOS App from an External Developer", Published on: Jul. 25, 2014 Available at: http://dev.mlsdigital.net/posts/how-to-resign-an-ios-app-from-external-developers/.
"Chrome Sender App Development", Published on: Mar. 10, 2014. Available at: https://developers.google.com/cast/docs/chrome_sender#setup.
"Microsoft Office for Dropbox", Retrieved on: Mar. 17, 2016 Available at: https://www.dropbox.com/help/7037.
"HockeyApp for iOS", Retrieved on: Mar. 17, 2016 Available at: http://support.hockeyapp.net/kb/client-integration-ios-mac-os-x-tvos/hockeyapp-for-ios.
"International Search Report and Written Opinion Issued in PCT Application No. PCT/US2017/037576", dated Sep. 21, 2017, 8 Pages.

* cited by examiner

ENABLING INTERACTION WITH AN EXTERNAL SERVICE FEATURE

BACKGROUND

Software development companies oftentimes form partnerships with other application developers or service providers to develop products that integrate various service functionalities. For example, a developer of productivity applications may partner with a cloud storage service provider for developing applications that enable users to access the cloud storage service via the productivity application or to access the productivity application via the cloud storage service.

Application developers typically use website hosted application market places, or application (app) stores, to distribute software applications, where users are enabled to browse through various categories, view information about applications, and acquire applications for download to a computing device. An application developer may benefit from publishing a version of an application for testing by users outside the company, enabling the application developer to receive feedback and fix bugs before the application is released to the general public. In a particular example, a developer would benefit to publish a test version of an integrated application to a third party partner for testing the integration before making the application publicly available. However, traditional app stores do not allow for developers to publish a test version of an application to third party users. Accordingly, developers are pressed to use other channels to distribute test applications.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage medium for enabling interaction with an external service feature. For example, an external service feature in an application may be a third party service feature that can be integrated with the application based on user demand and knowledge of a shared secret. A designated interface of the application is operable to receive a secret globally unique identifier (GUID) shared with the user by the application developer (e.g., service provider). In response to receiving the GUID in the designated interface, a request to enable the external service feature is sent. The request provides an indication to provide resources to interact with the external service feature. In some examples, the request is sent to the service provider via a network. In other examples, the request is internal to the application. Responsive to the request, resources associated with interacting with the external service feature are received, and interaction with the external service feature via the application is enabled. In one example, the resources include an interface for interacting with the external service feature. In another example, the resources include a code for unlocking a locked interface that is preloaded in the application. Various GUIDs may be used to enable different features. Further, a specified GUID may be used to disable interaction with the external service feature.

Examples are implemented as a computer process, a computing system, or as an article of manufacture such as a device, computer program product, or computer readable medium. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
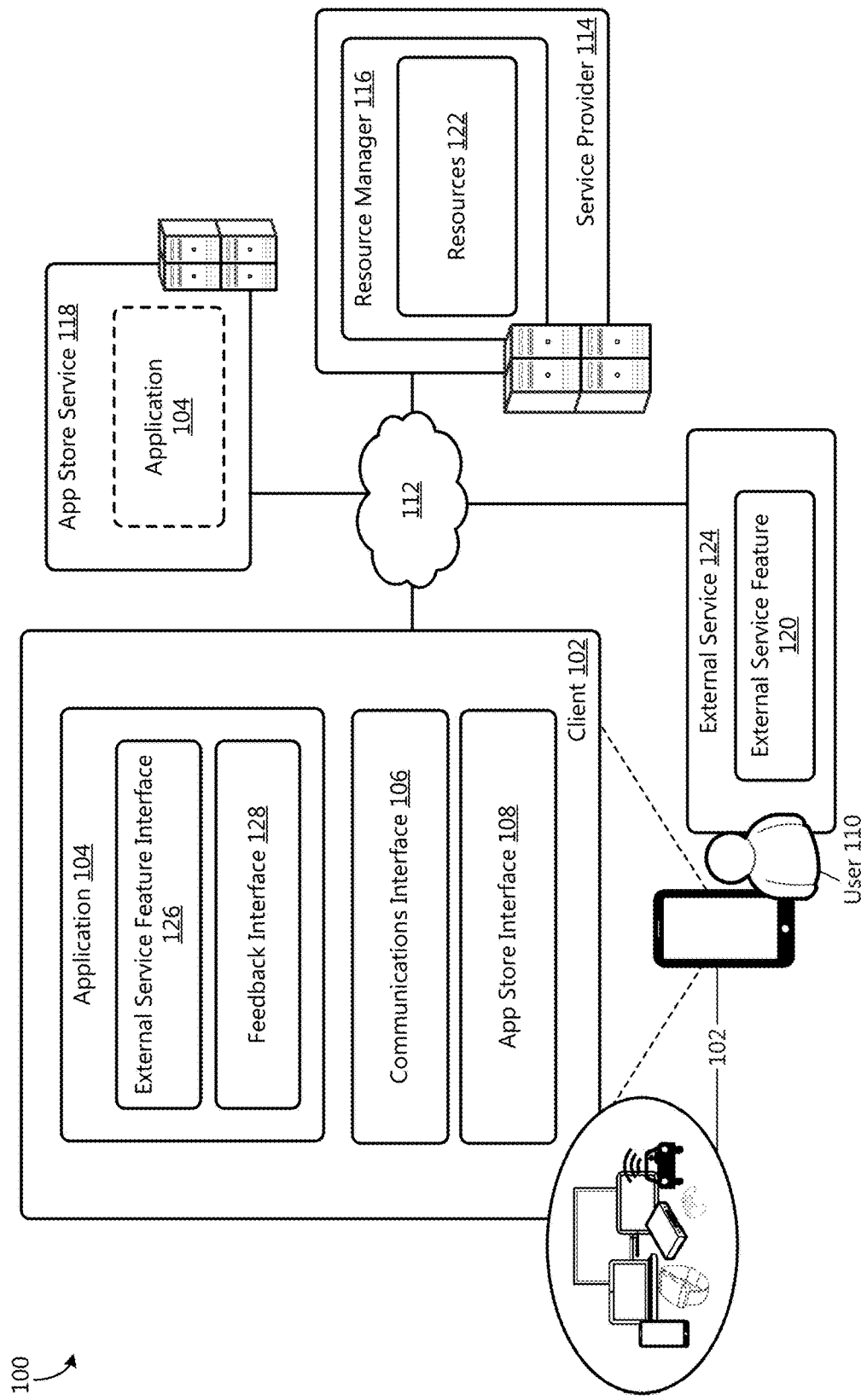
FIG. 1 is a block diagram showing components of an example system for enabling a productivity application to interact with an external service feature.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for enabling a productivity application to interact with an external service feature. For example, third party users, such as development partners associated with a product and service integration, are enabled to have pre-release access to external service features in a publicly-available application. According to examples, a globally-unique identifier (GUID) operable as a key is shared with a user. The user is enabled to input the GUID into a designated interface of a productivity application, which causes the productivity application to display functionality for enabling the user to select to enable the external service feature. Upon receiving a selection to enable the external service feature, a request is sent providing an indication to provide resources to interact with the external service feature. Responsive to the request, resources associated with interacting with the external service feature are received, and interaction with the external service feature is enabled by providing an interface within the productivity application for interacting with the external service feature.

By providing an interface within the productivity application for interacting with the external service feature in response to receiving resources associated with interacting with the external service feature, the present disclosure addresses a challenge of enabling service providers and third party partners to test pre-release features while adhering to app store policies and advantageously increases the efficiency of data transfer for downloading a productivity application where additional third party services can be integrated based on access permissions and user demand. Additionally, bandwidth is conserved, allowing users to stay within data usage caps.

With reference now to FIG. 1, a block diagram illustrating aspects of an example system 100 for enabling a productivity application to interact with an external service feature is shown. The example system 100 includes a client computing device 102, wherein the client 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications for performing a variety of tasks.

In examples, the client 102 includes a software application in the form of a communication interface 106. The communication interface 106 is illustrative of a software module, system, or device operative to enable the client 102 to communicate with and interact with various other entities (e.g., other clients, providers, servers, web sites). For example, the communication interface 106 may be configured as a web browser. Interactions with other entities can include sending and receiving electronic messages in various forms (e.g., e-mail, instant messages, text messages, and so forth) between the entities, obtaining resources (e.g., content and services) from the other entities, accessing and/or downloading various applications 104 from an online application store (app store 118), and so forth. In some examples, the client 102 comprises an app store interface 108, illustrative of a software module, system, or device operative to enable access of the client to the app store 118 through which various applications 104 can be made available to clients 102.

In one example, applications 104 that a user is enabled to select and download from the app store 118 include productivity applications, such as office productivity suites, accounting software, graphics applications, gaming applications, database programs, and any number of other types of applications. Examples of application data with which users interact include word processing documents, spreadsheets, databases, photos, game environments, and the like. A user may utilize an application 104 on a client 102 for a variety of tasks, which may include, for example, to write, calculate, draw, organize, prepare and view presentations, send and receive electronic mail, take and organize notes, make music, and the like. Applications 104 may include thick client applications, which may be stored locally on the client 102 (as illustrated in FIG. 1), or may include thin client applications (i.e., web applications) that may reside on a remote server and accessible over a network 112 or combination of networks (e.g., the Internet, wide area networks, local area networks). A thin client application may be hosted in a browser-controlled environment or coded in a browser-supported language and reliant on a common web browser to render the application executable on a client 102.

The app store interface 108 can be implemented in various ways to facilitate access to and navigation of a database of applications 104, selection and/or purchase of applications, and download of applications to the client 102. In some examples, the app store interface 108 is implemented as a standalone client application and/or as a component of the communication interface 106, such as being implemented as an add-in for a web browser. The app store interface 108 can also be implemented as a web-hosted application that the client 102 can access and run in conjunction with a service provider over a network (e.g., "in the cloud"). Thus, the app store interface 108 can be implemented in different ways for different client devices that can have different configurations and capabilities.

Application developers (i.e., service providers 114) oftentimes release beta software or a test version of applications to a limited or sometimes unlimited group of users for testing purposes. That is, typically, developers will release a test version prior to commercially releasing an application such that beta or test users can test features and report any major or minor bugs or issues they experience with the application to the developer. Accordingly, the developer is enabled to fix any problems with the application prior to commercially releasing a final version of the application to the general public.

However, traditional app stores 118 do not allow for developers (i.e., service providers 114) to publish a test version of an application 104 for access by third party users 110. That is, an app store 118 may allow developers to publish a test version of an application 104 for in-house distribution to a select number of devices of the service provider 114 for testing purposes, but prohibit the service provider from distributing the test version of the application to third party users 110. As described above, oftentimes service providers 114 form partnerships with external services 124 for development of applications 104 that integrate functionalities of the external service with functionalities of the application. Accordingly, it is desirable to enable users associated with the external service 124 (i.e., third party users 110) to test integrated features of an application 104 prior to enabling the general public to interact with the integrated features, for example, to test for and fix any errors or inaccuracies such that the application will perform optimally when it is commercially released.

According to examples, the application 104 is operative to enable interaction with one or more external service features 120. In one example, the application 104 interacts with external services 124 through a network 112, such as the Internet, to allow a user to utilize functionalities offered by the external services 124. One example of an external service feature 120 that may be integrated with an application 104, such as a productivity application, provides functionality to enable a user to save a document to a web-based storage site associated with the external service 124 or to access a document stored in a web-based storage site associated with the external service 124 directly from the application 104. The external service feature 120 may be associated with a partnership between a service provider 114 (provider of the application 104) and a third party service. As should be appreciated, the above example is not intended to be limiting, and interaction with many other examples of external service features 120 that may be enabled with the application 104 are within the scope of the disclosure.

According to an aspect, interaction with an external service feature 120 may not be automatically enabled. For example, when the productivity application 104 is downloaded from the app store 118, the application 104 may not comprise an interface for enabling the application 104 to interact with an external service feature 120, or may include an external service feature interface 126, but may require additional resources 122 for enabling use of the interface. In some examples, interaction with the external service feature 120 is intended to be publicly unavailable to general users, and requires a resource 122 (e.g., interface, content, metadata) for enabling interaction with the feature 120. The resource 122 may be located remotely on a service provider server 114, or may be included in the application 104. In one example, the client 102 is communicatively coupled over a network 112, such as the Internet, with the service provider server 114 from which resources 122 can be received. A service provider server 114 can be implemented by way of one or more server computing devices.

In some examples, the service provider 114 includes a resource manager 116. The resource manager 116 is illustrative of a software module, system, or device operative to manage various resources 122 that may be made available over the network 112. In one example, the resource manager 116 manages an external service feature interface 126 utilized to interact with the external service feature 120 within the productivity application 104. In another example, the resource manager 116 manages metadata that are utilized to enable an external service feature interface 126 preloaded in the productivity application 104. In another example, the resource manager 116 manages a provision of content over the network 112. For example, the resource manager 116 is operative to provide a service catalog including a list of external services 124 associated with external service features 120 with which the productivity application 104 is enabled to interact.

According to an example, the resources 122 managed by the resource manager 116 include some resources that are associated with publicly available external service features 120 in addition to resources that are associated with external service features 120 that are locked or not openly accessible, such as test or beta features. According to an aspect, access to resources associated with locked or not openly accessible external service features 120 require access permissions, such as a key.

According to an aspect, the resource manager 116 is operative to receive a request from the productivity application 104, wherein the request provides an indication to provide resources 122 to interact with an external service feature 120. For example, the request may include a flag that informs the resource manager 116 to return a specified resource 122 to the application. In one example, the request provides an indication for the resource manager 116 to return metadata for enabling a preloaded external service feature interface 126. In another example, the request provides an indication for the resource manager 116 to return the external service feature interface 126 for enabling interaction with the external service feature 120. In another example, the request provides an indication for the resource manager 116 to return content indicated by the request, such as a specific external services catalog including test or beta version external service features.

Figure 4:
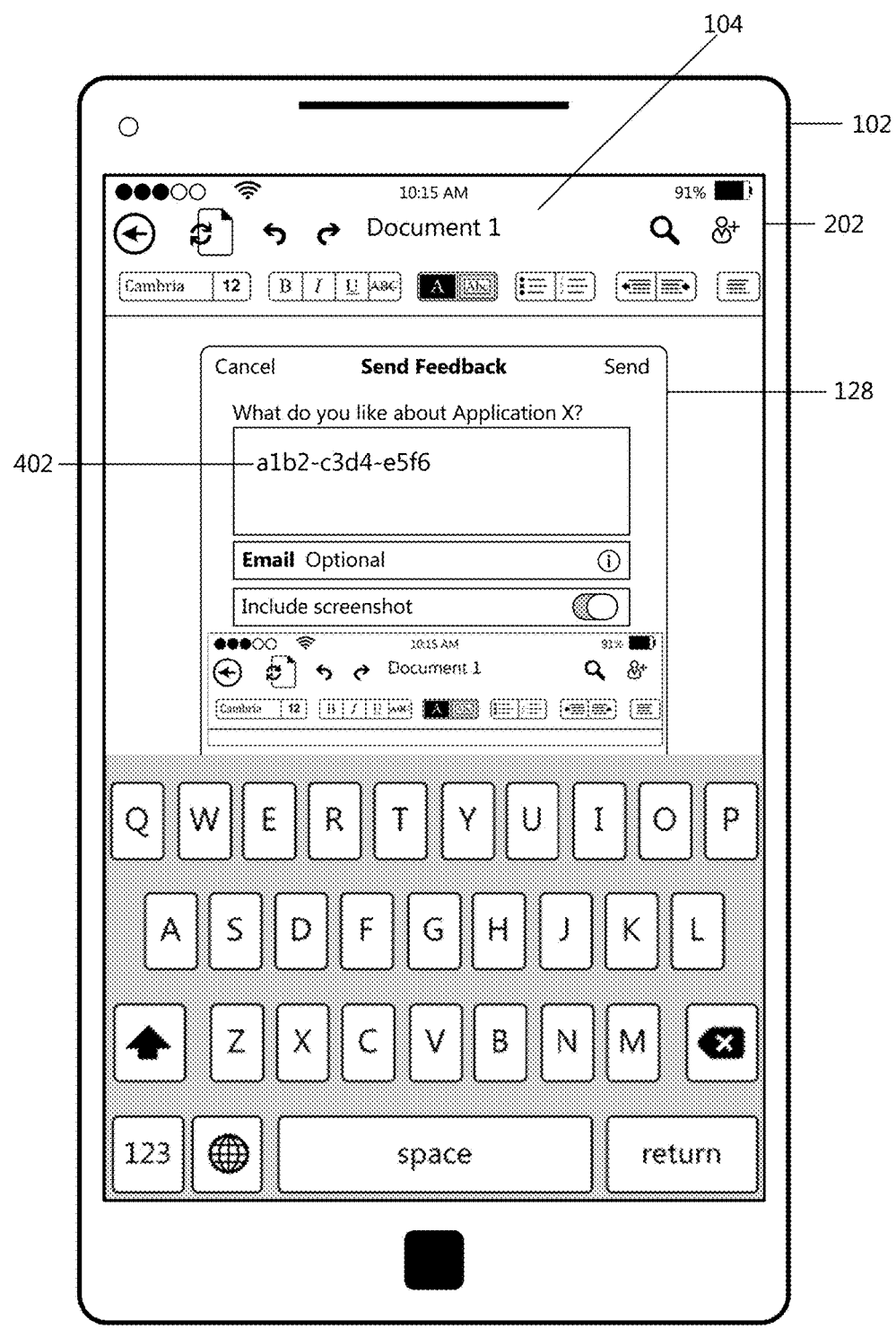
FIG. 4 is an illustration of an example application user interface display showing entry of a key in the feedback interface.

In various aspects, the application 104 includes a feedback interface 128 that operates to receive feedback from users of the application 104, and to send the received feedback to the service provider 114. For example, customers or users of the application 104 typically utilize the feedback interface 128 to provide feedback to the application developers (i.e., service provider 114) for communicating the user's opinions of the application, user experience with the application, or other information that may be utilized by the developer to improve the application 104. An example feedback interface 128 is illustrated in FIG. 4 and will be described in further detail below.

According to an aspect, a designated interface, such as the feedback interface 128, is operative to receive a globally unique identifier (GUID) input, wherein the GUID is operable as a key to enable an external service feature 120. The GUID is a shared secret between the service provider 114 and the user. According to an example, the user is associated with the external service 124, such as a developer or tester tasked with testing interaction functionality of the external service feature 120 in the productivity application 104. The GUID may be one of a plurality of shared GUIDs between the service provider 114 and the user.

Figure 2A:
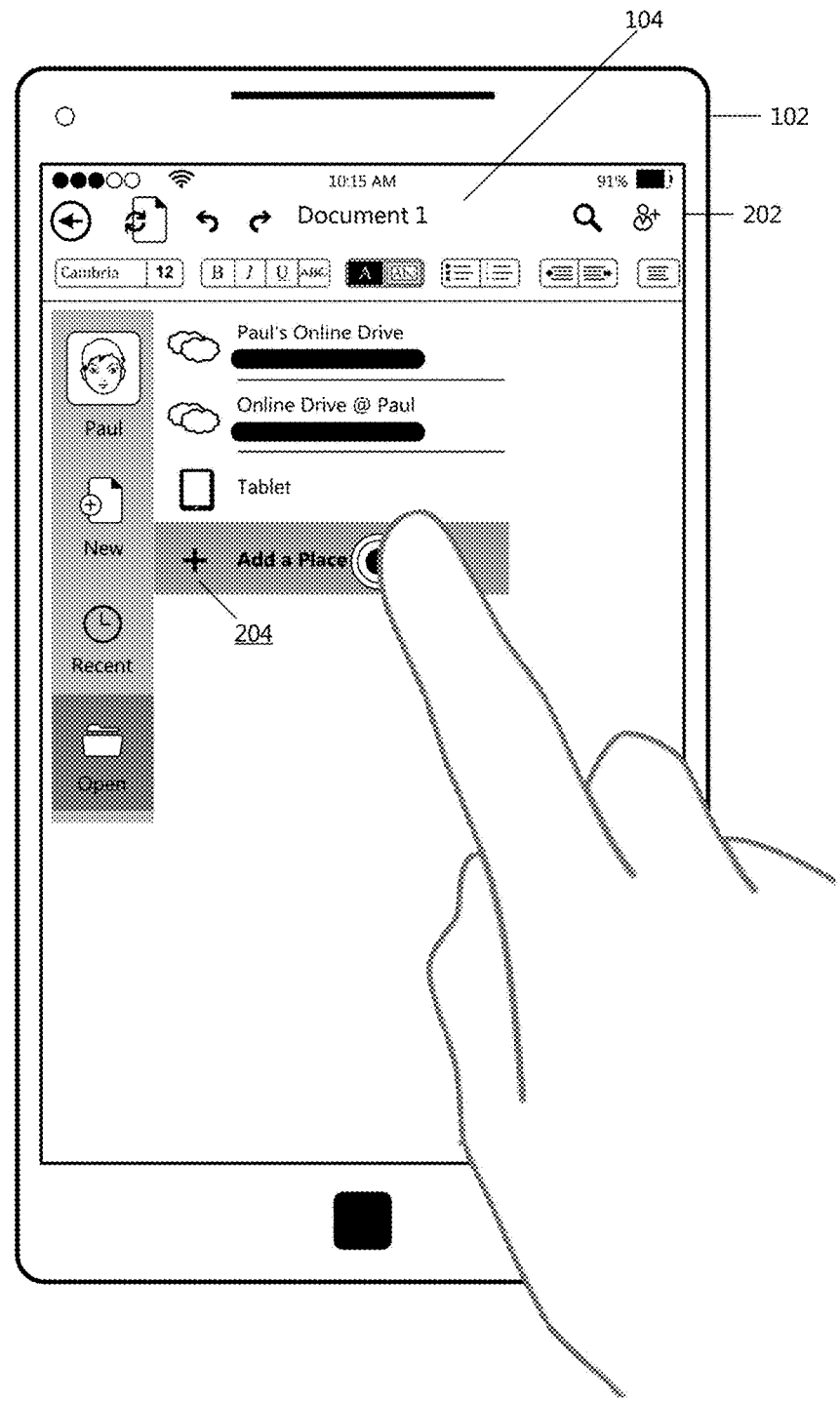
FIG. 2A is an illustration of an example application user interface display and shows a user selecting an application feature.
Figure 5A:
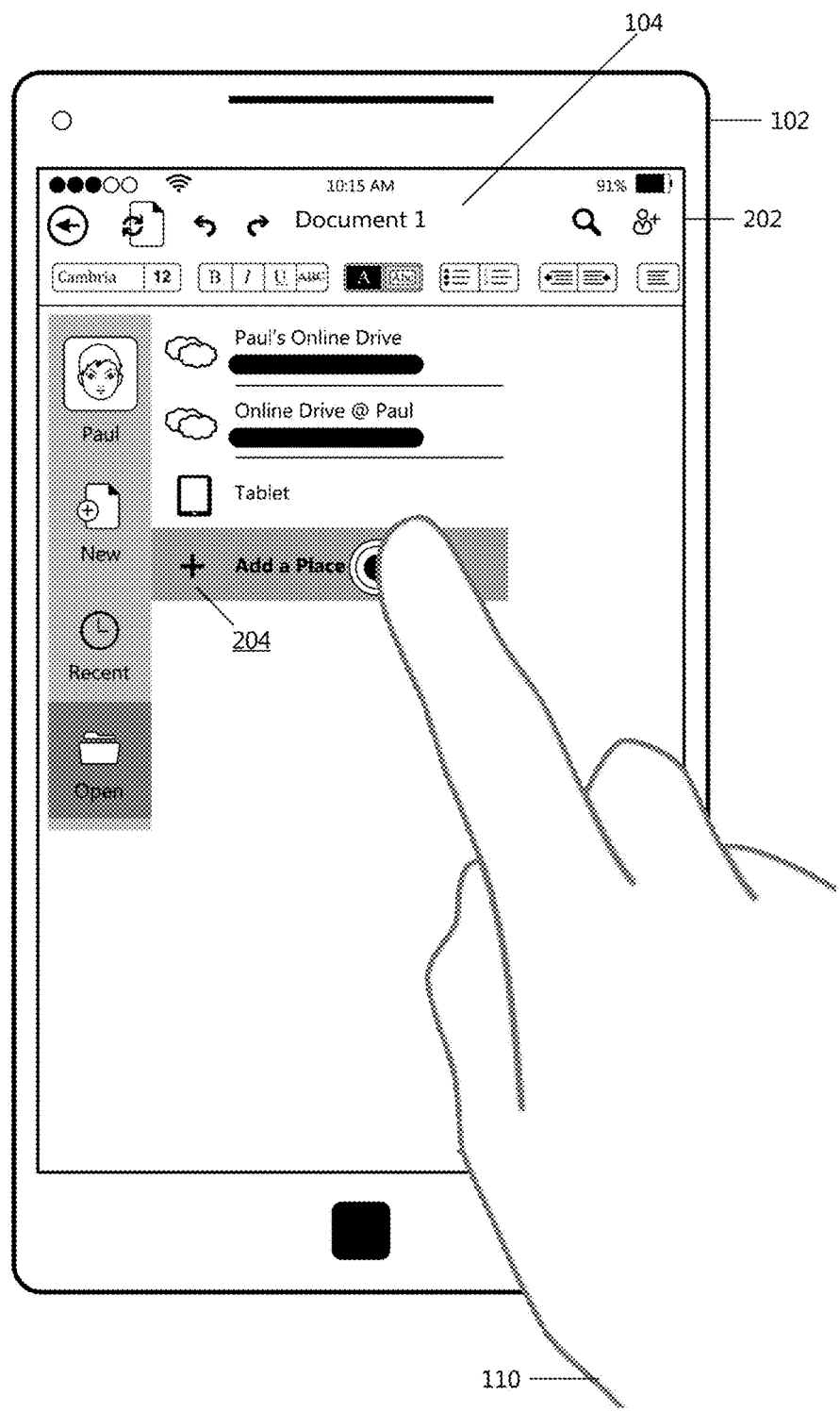
FIG. 5A is an illustration of an example application user interface display and shows a user selecting an application feature.

In one example, the GUID acts as a trigger to the application 104 to emit a signal to the service provider 114 for requesting a specified resource 122 to interact with an external service feature 120 based on the input GUID. According to an aspect, there may be a plurality of GUIDs that are associated with different external service features 120. For example, and as illustrated in FIGS. 2A and 5A, responsive to receiving an input of a GUID in the designated interface (e.g., feedback interface 128), functionality 204 for selecting to enable the external service feature 120 is displayed in an application user interface 202. The productivity application 104 is operative to receive an indication of a selection to enable the external service feature 120, such as via a selection of the functionality 204, and in response, sends a request to enable the external service feature 120.

In response, the resource manager 116 is operative to send a response to the application 104 comprising a resource 122 associated with interacting with the external service feature 120. For example, the resource 122 enables the application 104 to interact with the external service feature 120 by providing an interface within the productivity application 104 for interacting with the external service feature 120. In one example, the interface 126 enables the productivity application 104 to interact with a third party service, such as test or beta version service, thus allowing the user 110 to test the feature ahead of public release.

In another example, the GUID is a specified GUID that disables interaction with the external service feature 120. For example, a user 110 may input the specified GUID into the designated interface to turn off interaction with a test feature and return the application to a normal state. In one example, when the GUID associated with disabling interaction with the external service feature 120 is input in the feedback interface 128, the application 104 is operative to send a request to the service provider 114 for a resource 122 (e.g., content, metadata) associated with interaction with released or publically available features.

Figure 2B:
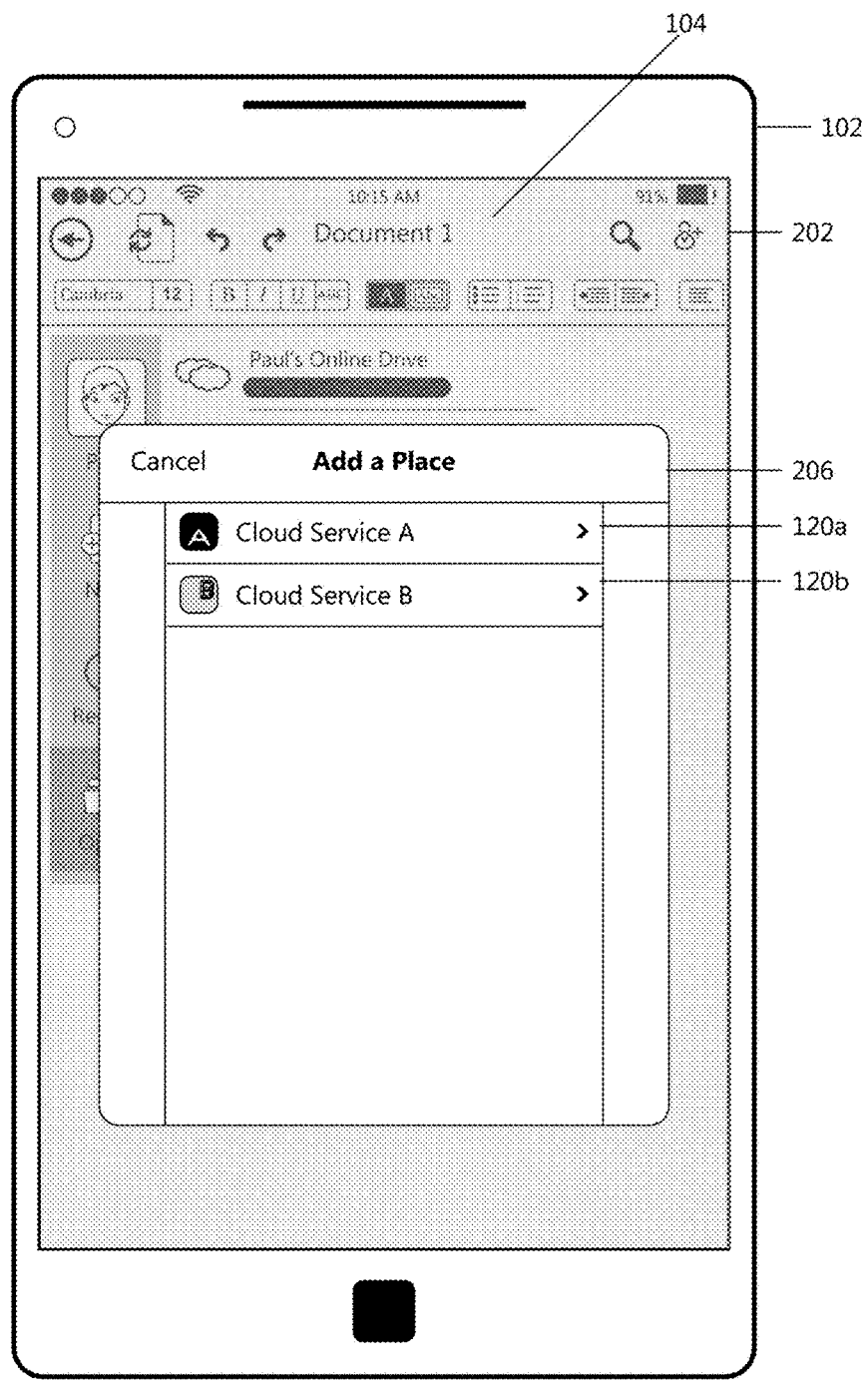
FIG. 2B is an illustration of the example application user interface display of FIG. 2A being updated to display a list of services with which the application is enabled to interact.

FIGS. 2A-B show example application user interface displays that illustrate what a user may experience without utilizing aspects of the present disclosure. With reference now to FIG. 2A, an example application user interface display 202 is illustrated. Further, FIG. 2A shows a user selecting a functionality 204 for selecting an external service feature. The user is shown selecting an "add a place" functionality 204 for selecting an online document storage service account to enable the user to open, create, edit, and save files back to the storage service from the application 104.

Upon selection of the "add a place" functionality 204, the productivity application 104 is operative to communicate with the service provider 114 for receiving data (i.e., a resource 122), such as a service catalog including online document storage services. With reference now to FIG. 2B, the application user interface display 202 is updated to display a list 206 of external service features 120a,b with which the productivity application is enabled to interact. For example, in the illustrated example, the external service features 120a,b are integrated online document storage services 208a,b that are publicly available for use by the application 104.

Figure 3:
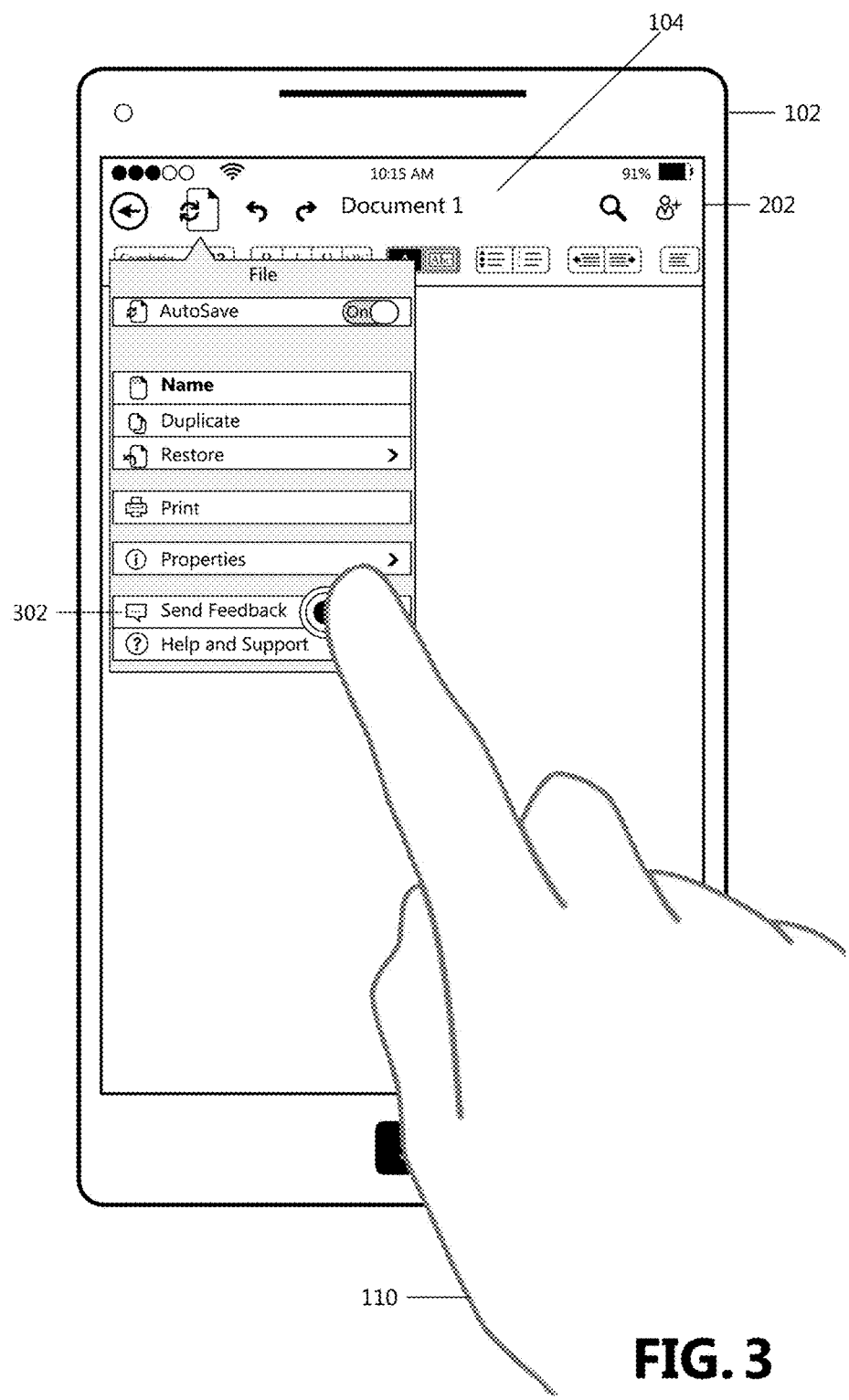
FIG. 3 is an illustration of an example application user interface display showing a selection of a feedback interface.

FIGS. 3-5B show a sequence of application user interface displays that illustrates what a user 110 may experience utilizing aspects of the present disclosure. With reference now to FIG. 3, the user 110 is illustrated selecting a command 302 for displaying a designated interface, such as a feedback interface 128. For example, the example application user interface display 202 is provided by an application 104 that is downloaded to the computing device 102 from an app store 118.

Upon selection of the control 302, the application 104 updates the user interface display 200 to display the designated interface (e.g., feedback interface 128) as illustrated in FIG. 4. According to an aspect and as illustrated, the user 110 is enabled to enter a GUID 402 into the feedback interface 128, wherein the GUID is a shared secret between the service provider 114 the user 110. According to an example, the GUID 402 is operable as a key for granting user access to resources 122 for interacting with an external service feature 120.

With reference now to FIG. 5A, responsive to receiving an input of a GUID 402 in the designated interface (e.g., feedback interface 128), functionality 204 for selecting to enable the external service feature 120 is displayed in an application user interface 202. As illustrated in FIG. 5A, the user 110 selects the functionality 204 to enable the external service feature 120, wherein the productivity application 104 is operative to receive an indication of the selection. In response, the productivity application 104 sends a request to enable the external service feature 120. In one example, the productivity application 104 includes a flag based on the entered GUID 402 with the request for the resources 122. Accordingly, the service provider 114 is operative to receive the request for resources 122 for enabling the productivity application 104 to interact with the external service feature 120.

Figure 5B:
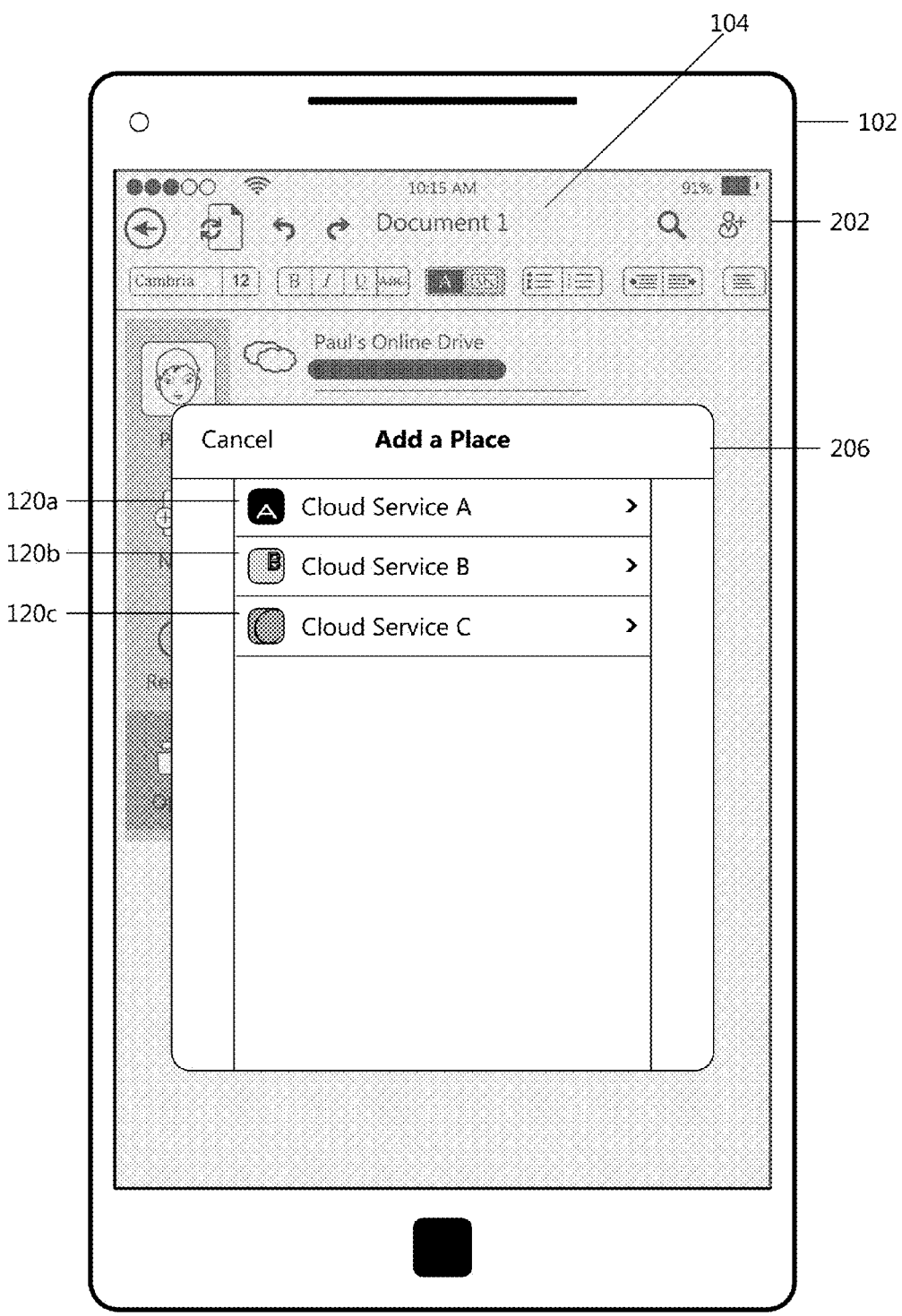
FIG. 5B is an illustration of the example application user interface display of FIG. 5A being updated to display a list of services with which the application is enabled to interact based on the entered key.
Figure 6:
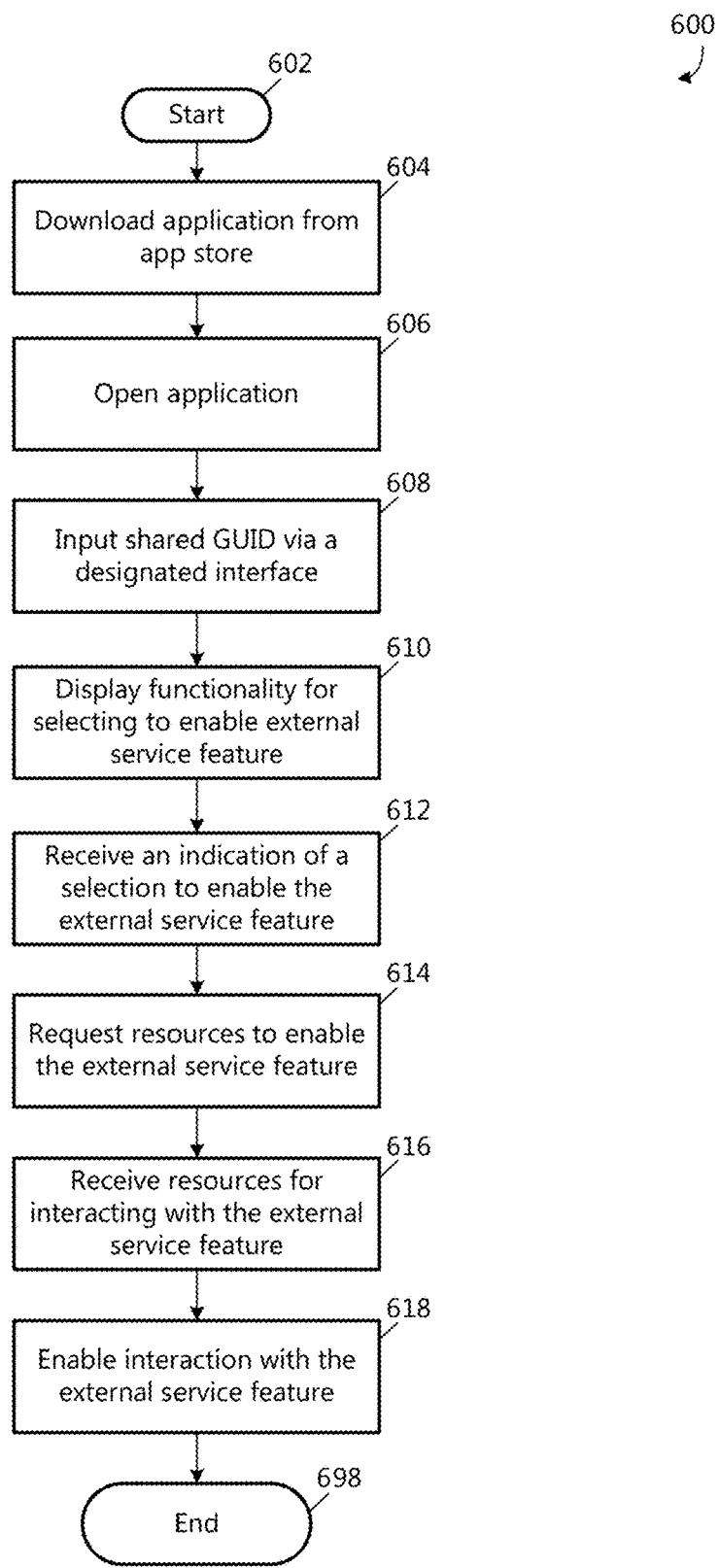
FIG. 6 is a flow chart showing general stages involved in an example method for enabling a productivity application to interact with an external service feature.

With reference now to FIG. 5B, the application user interface display 202 is updated to display the list 206 of external service features 120 with which the productivity application is enabled to interact. As illustrated, an additional external service feature 120c is added to the list 206 in response to receiving resources 122 enabling the application 104 to interact with the additional external service feature 120c. Accordingly, the user 110 is enabled to select the external service feature 120c and interact with the feature. For example, the user 110 is enabled to interact with an external service feature 120 via the productivity application 104 prior to the release of the feature to the general public.

Having described an operating environment and various user interface display examples with respect to FIGS. 1-5B, FIG. 6 is a flow chart showing general stages involved in an example method 600 for enabling a productivity application to interact with an external service feature. The method 600 starts at OPERATION 602 and proceeds to OPERATION 604, where a productivity application 104 is downloaded from an app store 118 to a computing device 102. For example, the productivity application 104 may be one of various types of applications, such as a word processing application, spreadsheet application, slide presentation application, and the like.

The method 600 proceeds to OPERATION 606, where the user 110 opens the productivity application 104, and then to OPERATION 608, where the user inputs a shared GUID 402 into the application via a designated interface, such as a feedback user interface 128 as illustrated in FIG. 4. In response to receiving the GUID 402, the method 600 proceeds to OPERATION 610, where functionality 204 is displayed for selection to enable the external service feature 120, for example, as illustrated in FIG. 5A. According to an example, the productivity application 104 makes a determination as to whether the input GUID 402 is valid and with which external service feature 120 the input GUID 402 is associated. For example, different GUIDS 402 may be input to enable interactions with specific external service features 120 or to disable specific external service features 120.

At OPERATION 612, an indication of a selection to enable an external service feature 120 is received, and in response, the method 600 proceeds to OPERATION 614, where a request to enable the external service feature 120 is sent. According to an example, the request provides an indication to provide resources 122 to interact with the external service feature 120. For example, the request provides an indication to provide metadata for enabling a preloaded external service feature interface 126. In another example, the request provides an indication to provide the external service feature interface 126 for enabling interaction with the external service feature 120. In another example, the request provides an indication to provide content indicated by the request, such as a specific external services catalog including test or beta version external service features.

The method 600 proceeds to OPERATION 616, where the productivity application 104 receives the resources 122 associated with interacting with the external service feature 120. The method 600 continues to OPERATION 618, where interaction with the external service feature 120 via the productivity application 104 is enabled by providing the external service feature interface 126 within the productivity application. According to an example, the interface 126 enables the productivity application 104 to interact with a third party service, such as test or beta version ahead service, thus allowing the user 110 to test the feature ahead of public release. The method 600 ends at OPERATION 698.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
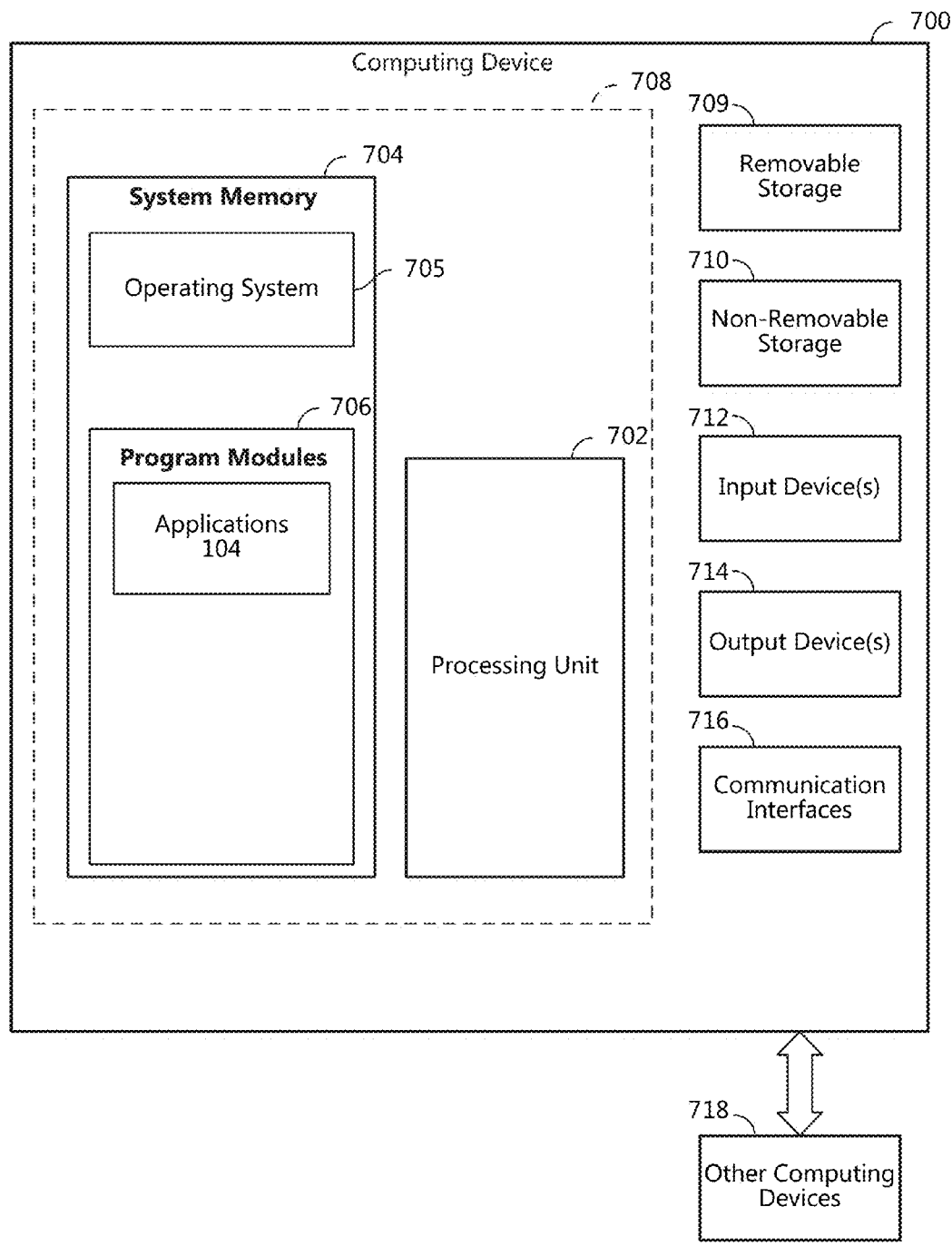
FIG. 7 is a block diagram illustrating example physical components of a computing device.
Figure 8A:
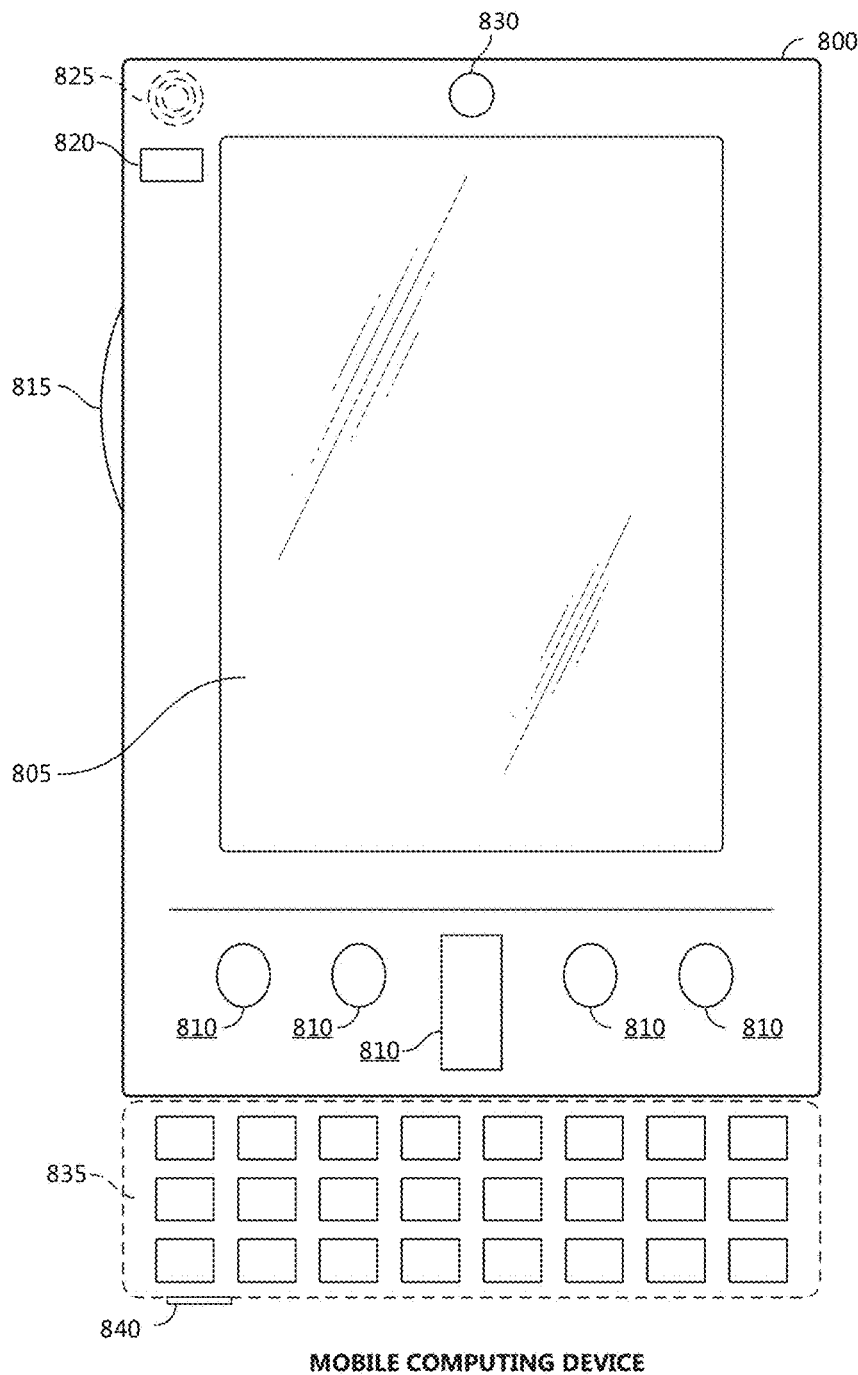
FIGS. 8A and 8B are block diagrams of a mobile computing device.
Figure 8B:
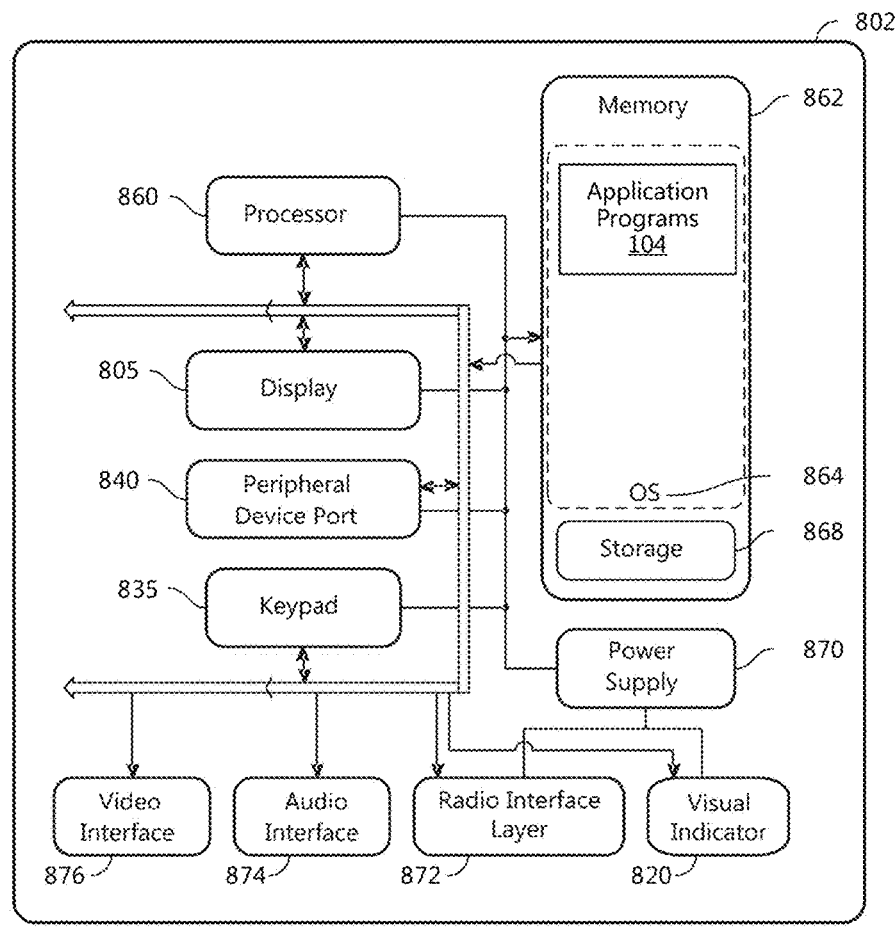
Figure 9:
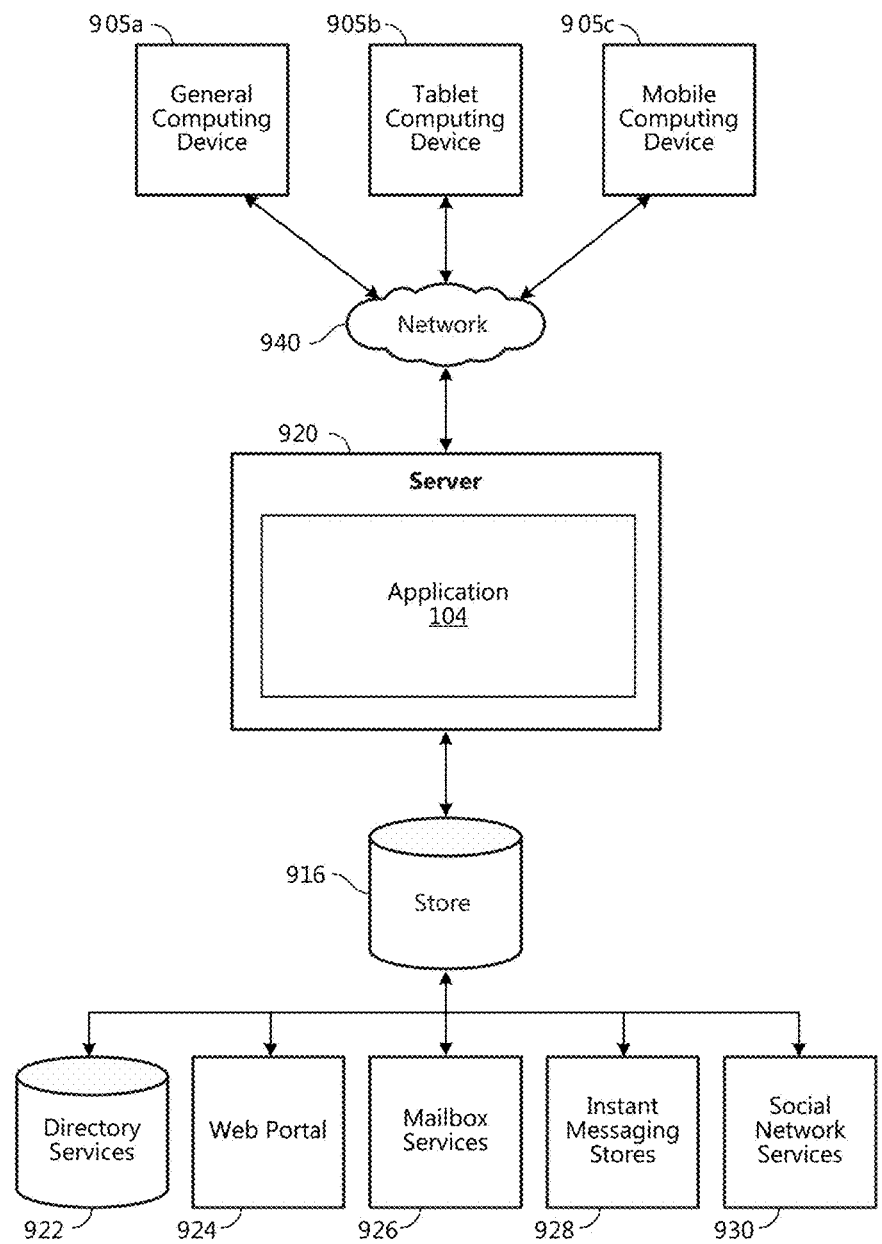
FIG. 9 is a block diagram of a distributed computing system.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure may be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 104. According to an aspect, the system memory 704 includes application 104. The operating system 705, for example, is suitable for controlling the operation of the computing device 700. Furthermore, aspects are practiced in conjunction with a graphics library, other operating systems, or any other application program, and is not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., applications 104) perform processes including, but not limited to, one or more of the stages of the method 600 illustrated in FIG. 6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or less input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 104 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, applications 104 are loaded into memory 862. The system 802 also includes a non-volatile storage area 868 within the memory 862. The non-volatile storage area 868 is used to store persistent information that should not be lost if the system 802 is powered down. The application programs 104 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 104 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 is stored locally on the mobile computing device 800, as described above. According to another aspect, the data is stored on any number of storage media that is accessible by the device via the radio 872 or via a wired connection between the mobile computing device 800 and a separate computing device associated with the mobile computing device 800, for example, a server computer in a distributed computing network, such as the Internet. As should be appreciated such data/information is accessible via the mobile computing device 800 via the radio 872 or via a distributed computing network. Similarly, according to an aspect, such data/information is readily transferred between computing devices for storage and use according to well-known data/information transfer and storage means, including electronic mail and collaborative data/information sharing systems.

FIG. 9 illustrates one example of the architecture of a system for enabling a productivity application to interact with an external service feature as described above. Content developed, interacted with, or edited in association with the application 104 is enabled to be stored in different communication channels or other storage types. For example, various documents may be stored using a directory service 922, a web portal 924, a mailbox service 926, an instant messaging store 928, or a social networking site 930. The application 104 is operative to use any of these types of systems or the like for enabling a productivity application to interact with an external service feature, as described herein. According to an aspect, a server 920 provides the application 104 to clients 905a,b,c. As one example, the server 920 is a web server providing the application 104 over the web. The server 920 provides the application 104 over the web to clients 905 through a network 940. By way of example, the client computing device is implemented and embodied in a personal computer 905a, a tablet computing device 905b or a mobile computing device 905c (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for enabling a productivity application to interact with an external service feature, comprising:
    receiving an input of a first globally-unique identifier (GUID) in a designated interface of a productivity application;
    in response to receiving the first GUID, displaying functionality for selecting to enable the external service feature;
    receiving an indication of a selection to enable the external service feature;
    sending a request to enable the external service feature, wherein the request provides an indication to provide resources to interact with the external service feature;
    receiving the resources associated with interacting with the external service feature;
    enabling interaction with the external service feature by providing an interface within the productivity application for interacting with the external service feature;
    receiving an input of a second GUID in the designated interface of the productivity application; and
    disabling interaction with the external service feature based on the received second GUID.

2. The method of claim 1, wherein receiving an input of the first GUID in a designated interface of a productivity application comprises receiving the first GUID in a feedback interface intended for communicating a user's opinions of the productivity application or user experience with the productivity application with a developer of the productivity application.

3. The method of claim 1, wherein sending the request to enable the external service feature comprises sending the request to a service provider associated with the productivity application over a network.

4. The method of claim 3, wherein receiving the resources associated with interacting with the external service feature comprises receiving an interface for enabling interaction with the external service feature with the productivity application.

5. The method of claim 4, wherein receiving an interface for enabling interaction with the external service feature with the productivity application comprises receiving an application programming interface developed by an external service.

6. The method of claim 1, wherein prior to receiving an input of the first GUID in a designated interface of a productivity application, downloading the productivity application from an application store, wherein the productivity application includes a preloaded locked interface for interacting with the external service feature.

7. The method of claim 6, wherein receiving the resources associated with interacting with the external service feature comprises receiving code to unlock the preloaded locked interface for enabling interaction with the external service feature.

8. The method of claim 1, wherein prior to receiving an input of the first GUID in a designated interface of a productivity application, receiving the first GUID from a service provider associated with the productivity application.

9. The method of claim 8, wherein receiving the first GUID from the service provider associated with the productivity application comprises receiving a plurality of GUIDs from the service provider, wherein one of the plurality of GUIDs comprises the second GUID.

10. The method of claim 1, wherein enabling interaction with the external service feature comprises enabling interaction with a prerelease third party service feature.

11. A system for enabling a productivity application to interact with an external service feature the system comprising a computing device, the computing device comprising:
at least one processing device; and
at least one computer readable data storage device storing instructions that, when executed by the at least one processing device are operable to provide a productivity application, operative to:
receive an input of a first service provider-provided key in a designated interface of the productivity application;
in response to receiving the first service provider-provided key, display functionality for selecting to enable an external service feature;
receive an indication of a selection to enable the external service feature;
send a request to enable the external service feature, wherein the request provides an indication to provide resources to interact with the external service feature;
receive the resources associated with interacting with the external service feature;
enable interaction with the external service feature by providing an interface within the productivity application for interacting with the external service feature;
receive an input of a second service provider-provided key in the designated interface of the productivity application; and
disable interaction with the external service feature based on the received second service provider-provided key.

12. The system of claim 11, wherein the designated interface of the productivity application is a feedback interface intended for communicating a user's opinions of the productivity application or user experience with the productivity application with a developer of the productivity application.

13. The system of claim 11, wherein in sending the request to enable the external service feature, the productivity application is operative to send the request to a service provider over a network.

14. The system of claim 13, wherein in receiving the resources associated with interacting with the external service feature, the productivity application is operative to receive an interface for enabling interaction with the external service feature with the productivity application.

15. The system of claim 14, wherein the interface is an application programming interface developed by an external service.

16. The system of claim 11, wherein the productivity application includes a preloaded locked interface for interacting with the external service feature.

17. The system of claim 16, wherein in receiving the resources associated with interacting with the external service feature comprises receiving code to unlock the preloaded locked interface for enabling interaction with the external service feature.

18. The system of claim 11, wherein the productivity application is operative to receive a plurality of service provider-provided keys from a service provider, wherein one of the plurality of service provider-provided keys is the second service provider-provided key.

19. The system of claim 11, wherein the external service feature is a prerelease third party service feature.

20. A computer readable storage media including computer readable instructions, which when executed by a processing unit is operative to:
receive an input of a service provider-provided globally unique identifier (GUID) in a feedback interface of a productivity application, the feedback interface configured to receive a user's opinions of the productivity application or user experience with the productivity application and provide the user's opinion to a developer of the productivity application;
in response to receiving the service provider-provided GUID, display functionality for selecting to enable a third party service feature;
receive an indication of a selection to enable the third party service feature;
send a request to enable the third party service feature, wherein the request provides an indication to provide resources to interact with the third party service feature, the resources comprising one of:
an interface for interacting with the third party service feature within the productivity application; or
code for unlocking a locked interface preloaded in the productivity application;
receive the resources associated with interacting with the third party service feature; and
enable interaction with the third party service feature via the productivity application by providing the interface within the productivity application for interacting with the third party service feature.

* * * * *